June 19, 1956

B. W. SPEEKMAN 2,751,318

METHOD OF MANUFACTURING COILS

Filed May 14, 1954

INVENTOR.
BERNARDUS WILLEBRORDUS SPEEKMAN

United States Patent Office 2,751,318
Patented June 19, 1956

2,751,318

METHOD OF MANUFACTURING COILS

Bernardus Willebrordus Speekman, Venlo, Netherlands, assignor to Hartford National Bank and Trust Company, Hartford, Conn., as trustee Application May 14, 1954, Serial No. 429,883

Claims priority, application Netherlands May 29, 1953

5 Claims. (Cl. 154—80)

The invention relates to a method of manufacturing coils.

It is known to wind a coil from insulated wire and thereupon to impregnate it with a thermoplastic or thermosetting resin with the result that a firmly coherent assembly is obtained. It is also known that a similar result is obtainable by applying a lacquer to the winding surface during winding by spraying. According to an alternative known method use is made of winding wire which in addition to a usual enamel lacquer insulating layer is coated with a superposed thermoplastic lacquer layer. In this case also a coherent assembly is obtained in that during or after winding heat is applied, if required, with some pressure. The last-mentioned method which is simpler than the two first-mentioned ones has the advantage that the amount of lacquer required for binding the turns and filling the spaces between the turns is easily controllable. It has a limitation, however, in that it requires special winding wire.

The invention relates to a method of manufacturing coils in which use can be made of normal, preferably enamel lacquer insulated, winding wire and which permits the amount of thermoplastic material to be controlled in a simple manner with the result that the spaces between the turns of the coil are filled satisfactorily and a satisfactory adhesion between the turns is obtained.

According to the invention insulated winding wire is wound so as to form a coil together with a thread of thermoplastic material which softens at a temperature at which the insulating material of the winding wire is not unduly decomposed and heat is applied to obtain a temperature at which the thermoplastic material softens during or after winding, if required, under pressure. The required quantity of thermoplastic material is in this case easily controllable by a proper choice of the thread diameter.

Figure 1:
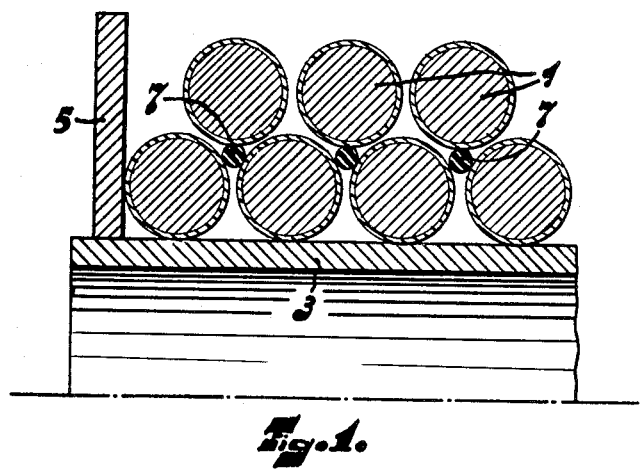

The invention is illustrated in the drawing. Fig. 1 shows a part of a coil in axial cross section which has been wound in a way according to the invention. The turns 1 of insulated copper wire are wound on a former 3 with a displaceable flange 5. The turns 1 are slightly spaced and in the spaces between the windings are wound turns 7 of a thread of thermoplastic material. These turns may be wound together with the second layer of wire turns 1.

Figure 2:
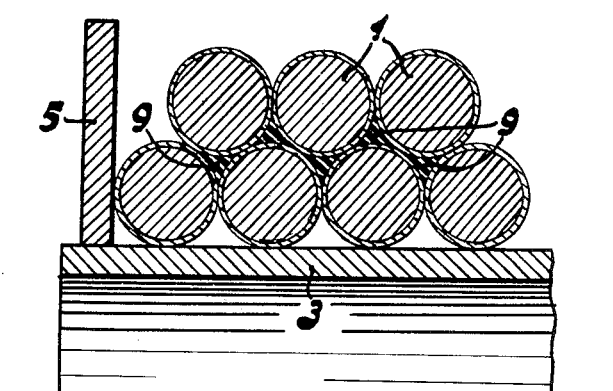

Fig. 2 shows the coil turns after being heated and compressed in axial direction. The thread of thermoplastic material is deformed to a substantially triangular cross-section as shown at 9 and preferably fills the interstices between the winding turns 1 completely.

Figure 3:
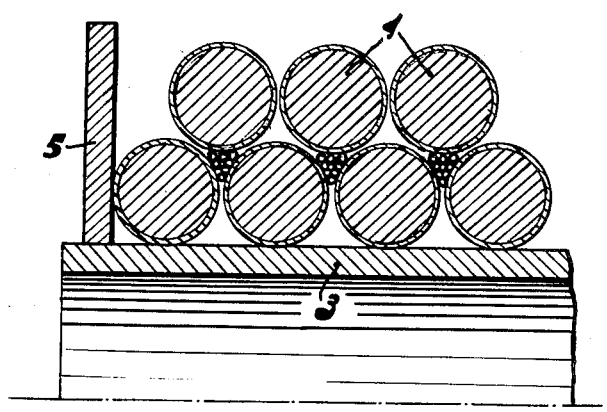

Preferably the thread of thermoplastic material consists of a bundle of filaments. If in this event the thread is not or substantially not twisted, the filaments are capable of easily sliding over each other with the result that already during the winding process the spaces between the insulated wire turns can be satisfactorily filled, as shown in Fig. 3.

As has been mentioned hereinbefore a thermoplastic material must be used which is softened at a temperature at which the insulating material of the winding wire is not unduly decomposed. Good results are, for example, obtained if, in the case of winding wire insulated by means of an enamel lacquer containing a polyvinyl acetal, for example polyvinyl formal, use is made of nylon thread which softens at a low temperature for example 170°, such as is, for example, the case with mixed condensates of adipic acid, hexamethylene diamine and caprolactam. A thread of acetyl cellulose may also be used.

In order that the spaces between the turns of the coil are filled in an optimum manner the diameter of the thread of thermoplastic material must be properly dimensioned, as has been mentioned hereinbefore. If, for example, winding wire of diameter $450\mu$ is used, comprising an insulating layer of polyvinyl formal lacquer $50\mu$ thick, use may be made of nylon thread $170\mu$ thick. This thread may alternatively consist of, for example, from 10 to 100 filaments.

What is claimed is:

1. A method of manufacturing electrical coils comprising winding a stranded insulated wire together with a plurality of threads of thermoplastic material, said thermoplastic material being adapted to soften at a temperature at which said insulated winding wire is not unduly decomposed, and applying heat to said wire to obtain said temperature.

2. A method of manufacturing electrical coils as set forth in claim 1 wherein said threads of thermoplastic material consists of a bundle of filaments.

3. A method of manufacturing electrical coils as set forth in claim 2 wherein said filaments are substantially parallel to each other.

4. A method of manufacturing electrical coils as set forth in claim 1 further applying pressure to said winding wire and wherein the quantity of thermoplastic material is sufficient to fill the voids between the strands of said wire.

5. A method of manufacturing electrical coils as set forth in claim 1 wherein said wire is insulated by a lacquer containing a polyvinyl acetal and the threads are constituted of nylon.

References Cited in the file of this patent

UNITED STATES PATENTS

| | | |
|---|---|---|
| 1,816,680 | Kurath | July 28, 1931 |
| 2,186,793 | Wodtke | Jan. 9, 1940 |
| 2,570,786 | Flynn et al. | Oct. 9, 1951 |
| 2,601,243 | Botts et al. | June 24, 1952 |